United States Patent [19]

Kodama et al.

[11] Patent Number: 5,470,491
[45] Date of Patent: Nov. 28, 1995

[54] PROCESS FOR PRODUCING A THIN-FILM MAGNETIC HEAD HAVING AN INSULATION FORMED OF A LADDER-TYPE SILICONE RESIN

[75] Inventors: Satoshi Kodama; Hiroshi Adachi, both of Hyogo, Japan

[73] Assignee: Mitsubishi Denki Kabushiki Kaisha, Tokyo, Japan

[21] Appl. No.: 400,478

[22] Filed: Mar. 8, 1995

Related U.S. Application Data

[60] Continuation of Ser. No. 290,109, Aug. 15, 1994, abandoned, which is a division of Ser. No. 53,196, Apr. 28, 1993, abandoned.

[30] Foreign Application Priority Data

Jul. 3, 1992 [JP] Japan .................................. 4-176893
Jul. 9, 1992 [JP] Japan .................................. 4-182316

[51] Int. Cl.⁶ ................................................. B44C 1/22
[52] U.S. Cl. ............................... 216/22; 216/41; 216/67
[58] Field of Search .................................. 360/122, 125, 360/126; 156/643.1, 655.1, 656.1, 659.1, 659.11, 648.1; 204/192.32, 192.34, 192.36; 428/429, 447; 528/43; 556/489; 216/22, 41, 49, 63, 67

[56] References Cited

U.S. PATENT DOCUMENTS

| | | | |
|---|---|---|---|
| 4,143,458 | 3/1979 | Gibson | 29/603 |
| 4,190,872 | 2/1980 | Jones, Jr. et al. | 360/125 |
| 4,349,609 | 9/1982 | Takeda et al. | 428/429 |
| 4,544,421 | 10/1985 | Springer | 148/103 |
| 4,841,624 | 6/1989 | Togawa et al. | 29/603 |
| 4,881,144 | 11/1989 | Yuito et al. | 360/126 |
| 5,032,944 | 7/1991 | Ohdoi | 360/126 |
| 5,057,336 | 10/1991 | Adachi et al. | 427/44 |
| 5,068,959 | 12/1991 | Sidman | 29/603 |
| 5,081,202 | 1/1992 | Adachi et al. | 528/43 |
| 5,187,860 | 2/1993 | Horibata et al. | 29/603 |

FOREIGN PATENT DOCUMENTS

| | | |
|---|---|---|
| 55-84019 | 6/1980 | Japan . |
| 60-95716 | 5/1985 | Japan . |
| 61-110320 | 5/1986 | Japan . |

OTHER PUBLICATIONS

M. Hanazono et al., "Design and Fabrication of Thin-Film Heads Based on a Dry Process (Invited)", *J. Appl. Phys.*, vol. 61, No. 8, Apr. 15, 1987, pp. 4157–4162.

M. Ohura et al., "Design of High Recording Density Thin-Film Heads for Particulate Rigid Disks", *J. Appl. Phys.*, vol. 61, No. 8, Apr. 15, 1987, pp. 4182–4184.

*Primary Examiner*—William Powell
*Attorney, Agent, or Firm*—Burns, Doane, Swecker & Mathis

[57] ABSTRACT

A thin-film magnetic head is provided which includes a substrate having formed thereon an upper and a lower thin-film magnetic core, a thin-film conductor coil, and a thin-film gap. An insulation layer is provided that electrically insulates the coil and the magnetic cores. The insulation layer is formed of an organic silicone resin with a ladder structure that is composed of silicon, oxygen and carbon. A resist is used as a mask to form the pattern of the insulation layer, and then the resin is removed

12 Claims, 8 Drawing Sheets

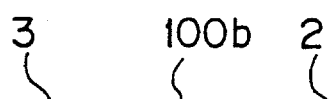
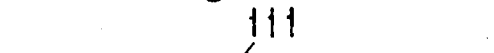
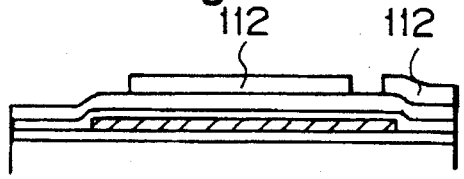
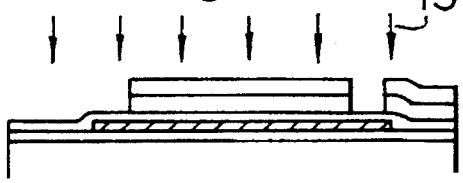
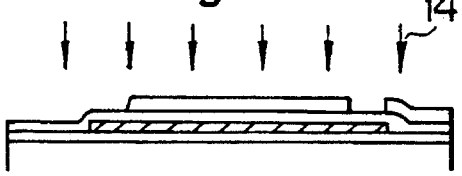
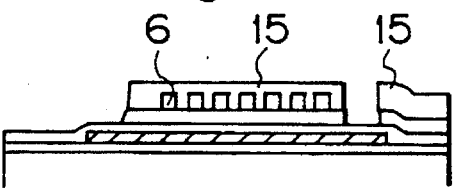
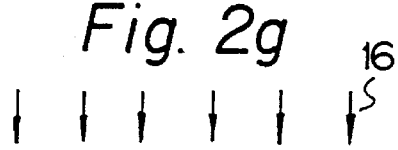
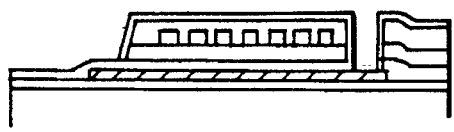
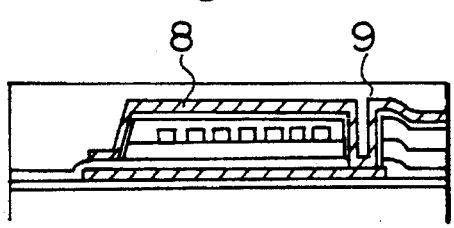

12
PROCESS FOR PRODUCING A THIN-FILM MAGNETIC HEAD HAVING AN INSULATION FORMED OF A LADDER-TYPE SILICONE RESIN

This application is a continuation of application Ser. No. 08/290,109, filed Aug. 15, 1994, now abandoned, which is a divisional of application Ser. No. 08/053,196, filed Apr. 28, 1993, now abandoned.

BACKGROUND OF THE INVENTION

According to its first aspect, the present invention relates to a thin-film magnetic head and a process for its production. More particularly, the invention relates to a thin-film magnetic head that is improved in the insulation layer between magnetic core and coil and which has good magnetic recording characteristics and reproduction efficiency. The invention also relates to a process for producing such an improved thin-film magnetic head.

Thin-film magnetic heads are produced by the same techniques as those used to fabricate integrated semiconductor circuits, including film deposition processes such as evaporation and sputtering, photomechanical processes, and lithographic processes such as etching techniques; these processes permit heads of high precision to be mass produced in one operation.

FIGS. 4a–4f show in cross section the steps involved in a process for producing a thin-film magnetic head as taught in Japanese Patent Laid-Open Publication (Kokai) SHO No. 55-84019. Shown by 1 in FIGS. 4a–4f is a substrate; 2 is a substrate protecting film; 3 is a lower magnetic core; 4 is a magnetic gap; 5 is a first insulation layer; 6 is a copper coil; 7 is a second insulation layer; 8 is an upper magnetic core; 9 is an insulating protective film.

The process of producing the thin-film magnetic head shown in FIG. 4a–4f starts with forming the substrate protecting film 2, the lower magnetic core 3 and the magnetic gap 4 on the substrate 1 (FIG. 4a). The magnetic gap 4 is an inorganic insulating sputtered film, typically formed of alumina. On top of the magnetic gap 4 is formed the lower insulation layer 5 by a photolithographic process using a photoresist of the corresponding shape. The photoresist is cured by heating at 200°–250° C. (FIG. 4b). Subsequently, the copper coil 6 is formed and the upper insulation layer 7 is formed with a photoresist by the same method as used in forming the lower insulation layer 5 (FIG. 4c). Subsequently, the upper magnetic core 8 is formed (FIG. 3d). The copper coil 6, the lower magnetic core 4 and the upper magnetic core 10 are formed by patterned plating. Then, the insulating protective layer 9 is deposited and polished (FIG. 4e). Finally, the assembly is lapped until the end of the upper magnetic core becomes exposed (FIG. 4f).

The above-described process for producing a thin-film magnetic head has an advantage over the process for producing the conventional bulk magnetic head in that magnetic cores and coil windings can be formed in one operation for each substrate.

However, in that process for producing a thin-film magnetic head, the magnetic cores are formed by plating and, hence, the materials that can be used to make the magnetic cores are limited, thus making it impossible to use materials having better magnetic characteristics. In other words, when forming magnetic cores, it is advantageous to deposit films by dry processes such as sputtering that permit materials selection from a broader range than when the plating method is used.

On the other hand, if magnetic cores are formed by a dry film deposition process such as sputtering in accordance with the procedure shown in FIG. 4, cracks will sometimes develop in the photoresist or the thin magnetic films forming the magnetic cores will come off the underlying layers on account of the gas evolved from the resist and this is due to the temperature elevation that takes place when forming those thin films or due to the heat treatment that is optionally performed to improve the magnetic characteristics of the core.

A further problem is associated with the curing of the photoresist by heating. Above 250° C., the photoresist undergoes extensive thermal decomposition and this makes it difficult to perform the optional heat treatment at 250° C. or above.

SUMMARY OF THE INVENTION

The first aspect of the present invention has been accomplished under these circumstances and has as an object providing a process for producing a thin-film magnetic head with satisfactory performance using an organic insulating layer that can be formed by the dry film deposition method. Another object of the invention is to provide a thin-film magnetic head that has good magnetic recording characteristics and reproduction efficiency.

The first object of the present invention can be attained by a thin-film magnetic head that comprises a substrate having formed thereon an upper and a lower thin-film magnetic core, a thin-film conductor coil, a thin-film gap, and an insulation layer that electrically insulates said coil and said magnetic cores, said insulation layer being formed of an organic silicone resin with a ladder structure that is chiefly composed of silicon, oxygen and carbon, a photoresist being used as an etching mask, the pattern of the insulation layer being formed by etching with a plasma of oxygen and a freon containing at least one member selected from among $CF_4$, $SF_6$ and $CHF_3$, and the photoresist mask being subsequently removed by ashing.

The second object of the present invention can be attained by a process for producing the thin-film magnetic head described above, which process includes the step of forming on said thin-film gap a protective sacrificial layer having a different etching property than said thin-film gap, thereby preventing the etching of said thin-film gap so as to facilitate the control of its thickness.

The second object of the invention can also be attained by a process for producing the thin-film magnetic head described above, which process includes the step of forming a thin inorganic film containing a silicon element for providing enhanced adhesion before the organic silicone resin is patterned to form the insulation layer, said adhesion-enhancing thin film being removed before the formation of said magnetic cores.

The second object of the present invention can also be attained by a process for producing the thin-film magnetic head described above, which process includes the steps of forming the lower thin-film magnetic core, the thin-film conductor coil, and the insulation layer that electrically insulates said lower magnetic core from said coil, subsequently forming the thin-film gap and then forming the upper magnetic core.

The second object of the present invention can also be attained by a process for producing the thin-film magnetic head described above, which process includes the steps of ashing the resist mask with an oxygen plasma and subsequently performing ashing with an ion beam.

These processes of the present invention are capable of forming an insulation layer without causing cracks or delamination even if temperature elevation occurs during the formation of a magnetic film for the upper magnetic core or even if a heat treatment is optionally performed to improve the magnetic characteristics of the core.

As another advantage of the improvement in the heat resisting temperature of the insulation layer, the temperature range for annealing the magnetic film is sufficiently expanded to permit the use of a magnetic core material having better magnetic characteristics.

According to its second aspect, the present invention relates to a thin-film magnetic head for use on a magnetic disk apparatus and a magnetic tape apparatus, more particularly, to a thin-film magnetic head that uses a highly heat-resistant silicone resin of a ladder type in a coil insulating layer and which is suitable for use with a magnetic core of high saturation flux density, as well as a process for producing such a thin-film magnetic head.

FIG. 4g illustrates the structure of a prior art thin-film magnetic head of the type described in Japanese Patent Laid-Open Publication (Kokai) SHO No. 55-84019. Shown by 1 in FIG. 4g is a non-magnetic ceramic substrate; 3 and 10 are each a magnetic core made of a NiFe alloy; 4 is a magnetic gap made of $Al_2O_3$; 6 is a signal coil made of Cu; 12 is a coil insulating layer that is formed of a photoresist; 2 and 11 are each a protective $Al_2O_3$ layer. As shown in FIG. 4g, the magnetic head under consideration has the $Al_2O_3$ magnetic gap 4 formed on the lower magnetic core 3 on the substrate 1, and the insulating photoresist layer 12 is formed over the magnetic gap 4, with the signal coil 6 being formed on top of the resist layer 12. The coil 6 is covered with the insulating photoresist layer 12 and, then the upper magnetic core 10 is formed.

The coil insulating layer 12 electrically insulates the magnetic core 3 from the coil 6 and, at the same time, it serves to flatten out the undulations produced by the coil 6 (if a magnetic film is formed over the undulations, the anti-magnetism of edge poles will cause deterioration of the magnetic characteristics of the film).

Thin-film magnetic heads are produced by photolithographic processes as in the case of fabricating integrated semiconductor circuits; hence, compared to the conventional bulk heads produced by machining, thin-film magnetic heads have the advantage of being highly adapted to the use of high-performance magnetic films. Furthermore, they permit the use of magnetic cores and coils that are small enough to insure high resistance to external noise, produce greater output per inductance, provide good characteristics at high frequencies, thereby proving suitable for high-density recording.

Because of these features, the use of thin-film magnetic heads is increasing today, particularly in high-density recording applications. However, in order to permit magnetic recording at even higher densities, it is necessary not only to make the magnetic core of a material having high saturation flux density Bs but also to increase the coil density (i.e., increasing the number of turns within a given area and yet suppressing the increase in resistance).

However, magnetic films of high Bs are formed by sputtering and must be heat treated in a magnetic field at several hundred degrees Celsius. Therefore, the heat resistance of insulation layers need be considered in the production of conventional thin-film magnetic heads. To state more specifically, insulating photoresist layers are capable of withstanding heat up to about 200° C. (above which, thermal decomposition will occur). Conventional NiFe alloys (Bs= 0.8T) are formed by electroplating and need not be heat treated; therefore, the heat resistance of insulating photoresist layers will present no problem. However, CoZrNb films having Bs=1.3T need be heat treated at 300° C. and FeTaN films having Bs=1.6T need be heat treated at 500° C.; in these cases, a photoresist cannot be used as an insulation layer.

Even in the case of magnetic heads using NiFe alloys made by plating, heat treatment may occasionally be conducted in the last step at about 200° C. in order to improve the head characteristics by relaxing the overall stress and this may sometimes cause separation between the insulating resist layer and the protective $Al_2O_3$ layer, probably due to the gas evolved by the thermal decomposition of the resist.

Various materials have heretofore been proposed as photoresist substitutes having high thermal decomposition temperatures; polyimide resins are used as heat-resisting resin materials, and $Al_2O_3$ and $SiO_2$ are used as inorganic heat-resisting materials. However, insulation layers made of these materials have the following problems. The first problem with polyimide resins is that they react with the coil forming Cu to dissolve it. To avoid this problem, the coil must be covered with a separate protective film or otherwise treated appropriately but this only adds an extra step to the process. Aluminum may be used as a coil material that does not react with polyimides but because of its low resistance, aluminum is inferior to Cu.

Secondly, polyimides react with core forming magnetic materials such as Permalloy (FeNi alloy) to cause occasional deterioration in their magnetic characteristics. To avoid this problem, the coil must be covered with a separate protective film or otherwise treated by appropriate means.

Thirdly the weight of polyimide film will decrease so greatly during a heat treatment that in the initial spin coating, the polyamide film must be applied in a sufficient thickness to allow for the subsequent decrease in weight; however, this only increases the chance of the occurrence of variations in film thickness. As a further problem, the great decrease in the weight of polyimide film means a great shrinkage in its volume, hence, a great change in stress, which can potentially cause adverse effects on the magnetic characteristics of the magnetic film.

Fourthly, polyimide resins are less flowable than photoresists and are incapable of flattening out the undulations in the coil layer merely by performing spin coating and subsequent heat treatment; hence, subsequent etch-back is necessary (etch-back is a treatment in which a highly flowable material such as a photoresist is applied to the undulations in the surface of the underlying layer and ion etched under such conditions that the underlying layer and the resist can be etched at the same rate, whereby the resist pattern is transferred onto the underlying layer).

Fifthly, polyimide films must be heat treated to cure at about 300° C. and, hence, they are not suitable for application to materials of low heat resistance such as Permalloy plates.

In addition to these problems, polyimide resins have various other defects such as poor adhesion and, hence, are not suitable for use in practical applications.

Inorganic insulation layers are deposited by bias sputtering or CVD but they are incapable of flattening out the undulations in the surface of the coil layer completely until subsequent etch-back or polishing is performed; however, this adds to the complexity of the process. To achieve the intended flattening process, the inorganic layer must be applied in a thickness that is about 5–6 μm greater than the thickness of the coil layer, allowing for both the tolerance of etching and the residue on the coil layer; however, forming such thick films is not recommended from the viewpoint of production rate.

As another problem, inorganic films being deposited are incapable of completely filling the recesses in the surface of the coil layer, leaving "cavities" behind. This is because the recesses in the coil surface are "valleys" where the probability of the arrival of particles is lower than the value for the other areas (which are not "valleys"). The formation of such "cavities" can be a cause of delamination or foaming in subsequent steps. Furthermore, film deposition from inorganic insulating materials and ion etching thereof require expensive apparatus, thus leading to higher equipment cost. These problems will become serious in coils that are adapted for future magnetic recording at higher density and which have small pitches and low resistance (i.e., coils having narrow and deep recesses in their surface).

The second aspect of the present invention has been accomplished under these circumstances and has as an object providing a thin-film magnetic head that permits high-density recording and which yet can be manufactured at low cost while insuring high operational reliability by using an insulation film that is capable of withstanding the temperature elevation due to the formation of a magnetic film and subsequent heat treatment and which has high degree of flatness.

In order to attain this object, the present inventors conducted intensive studies in search for highly heat resistant resins that would be suitable for use in the insulation layer described above. As a result, the inventors found that a silicone resin of a ladder type did not react with the coil forming copper, nor did it cause any adverse effects on the magnetic characteristics of the coil. The present invention has been accomplished on the basis of this finding.

Stated briefly, the present invention is characterized by using a ladder-type silicone resin of high heat resistance and strong adhesion in forming an insulation layer that permits a suitable temperature for heat treatment in accordance with the specific magnetic material used, that has the necessary heat resistance, that will experience only a small decrease in weight during heat treatment and that can be spin-coated to flatten out all the undulations in the surface of the coil layer. According to the present invention having this characteristic, there is provided a thin-film magnetic head that has a high-density coil wound around a magnetic core that is made of a high-Bs magnetic material adapted for high-density magnetic recording.

In the present invention, the highly heat-resistant silicone resin of a ladder type is used as the material of a coil insulating layer. This ladder-type silicone resin withstands the temperature elevation ($\geq 200°$ C.) which occurs during the deposition of a magnetic film and subsequent heat treatment and, furthermore, it has a high degree of flatness. These features contribute to the production of a thin-film magnetic head that is capable of high-density recording.

BRIEF DESCRIPTION OF THE DRAWINGS

FIGS. 2a–2i are is a set of sectional views showing the process for producing a thin-film magnetic head according to another embodiment of the first aspect of the present invention;

DETAILED DESCRIPTION OF THE INVENTION

Figure 1A:
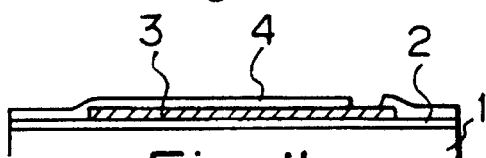
FIGS. 1a–1i are is a set of sectional views showing the process for producing a thin-film magnetic head according to an embodiment of the first aspect of the present invention.

The silicone resin of a ladder type which is to be used in the present invention is described below in detail.

The heat-setting silicone resin of a ladder type which is used in the coil insulating layer is represented by the general formula (I) set forth below. The temperature at which this silicone resin is heat treated to become insoluble varies with its molecular weight and the terminal group present. If the terminal group is a silanol groups, heat treatment must be conducted at 300° C. for 1 h in the case of a ladder-type silicone resin having a sufficient molecular weight to provide a thin film in a thickness of 3–4 μm (weight average molecular weight=$1$–$10 \times 10^4$) and it must be conducted at 350° C. or more for at least 1 h in the case of a ladder-type silicone resin having a sufficient molecular weight to provide a thin film in a thickness of 6 μm (weight average molecular weight $\geq 10^5$).

However, in order to attain the heat resistance necessary for the heat treatment to be conducted after the deposition of an insulation film, one only need perform a heat treatment for a period of at least 30 min at a temperature not lower than the boiling point of the solvent for the ladder-type silicone resin. In the case where the terminal group is an alkoxy group, the temperature for a heat curing must be 50° C. higher than when the terminal group is a silanol group.

Specific examples of the ladder-type silicone resin represented by the general formula (1) include, but are by no means limited to, phenyl silsesquioxane, methyl silsesquioxane and ethyl silsesquioxane.

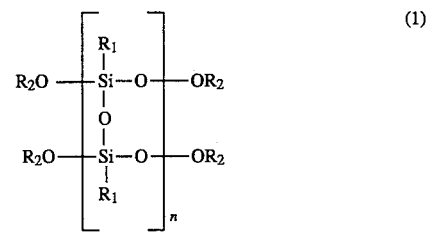

(where $R_1$ which may be the same or different is a phenyl group or a lower alkyl group such as methyl or ethyl; $R_2$ which may be the same or different is a hydrogen atom or a lower alkyl group such as methyl or ethyl; and n is an integer providing a prescribed weight average molecular weight).

To form a pattern in the film of the ladder-type silicone resin, the applied film on the substrate is dried and subsequently etched with an organic solvent using a resist mask. Organic solvents that can be used include anisole, toluene, ethoxybenzene and other solvents that dissolve the ladder-type silicone resin and these solvents may be used either alone or in admixture. The etch rate can be controlled by partial mixing of a non-solvent such as xylene.

Also useful are photosensitive silicone resins of a ladder type that are represented by the general formula (2) shown below. After pattern formation, photosensitive silicone resins of ladder type may be heat treated at temperatures not lower than the boiling point of the solvent for the purpose of stabilizing the pattern and improving the heat resistance of the film. Specific examples of such photosensitive silicone resins of ladder type (2) include, but are not limited to, phenylvinyl silsesquioxane, phenylallyl silsesquioxane and methylvinyl silsesquioxane.

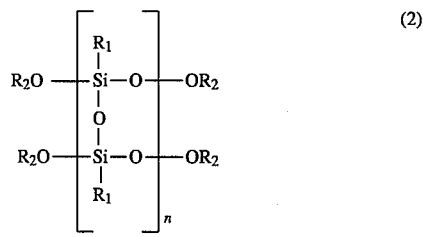

(2)

(where $R_1$ is a phenyl group, a lower alkyl group such as methyl or ethyl, or a photosensitive alkenyl group, with the alkenyl group being contained in an amount of at least 10 mol %; $R_2$ which may be the same or different is a hydrogen atom or a lower alkyl group such as methyl or ethyl; and n is an integer providing a prescribed weight average molecular weight).

The following examples are provided for the purpose of further illustrating the first and second aspects of the present invention but are in no way to be taken as limiting. Thus, the present invention is also applicable to a thin-film magnetic head in which the coil is formed of multiple layers.

EXAMPLE 1

Figure 4A:
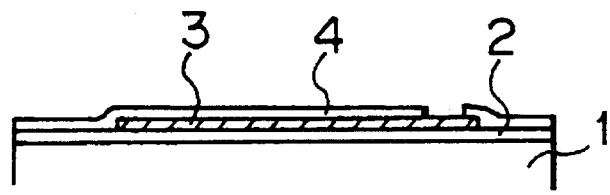
FIGS. 4a–4g are sectional views showing the process for producing a thin-film magnetic head in the prior art.
Figure 4B:
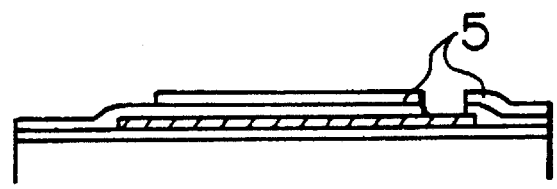
Figure 4C:
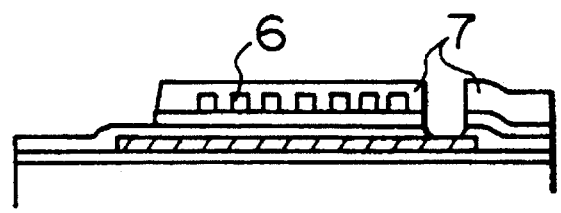
Figure 4D:
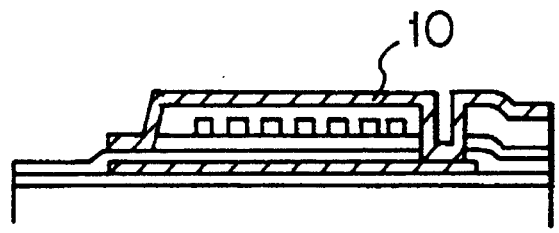
Figure 4E:
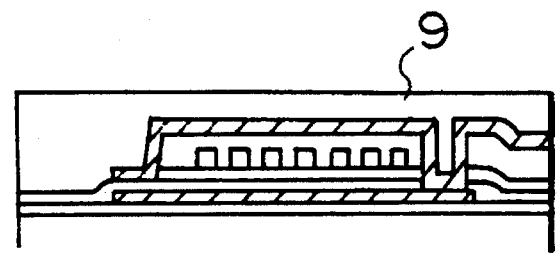
Figure 4F:
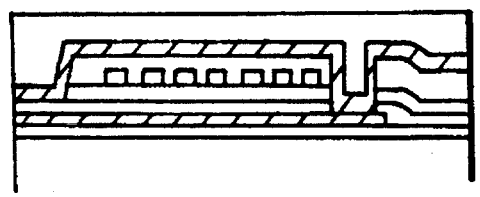
Figure 4G:
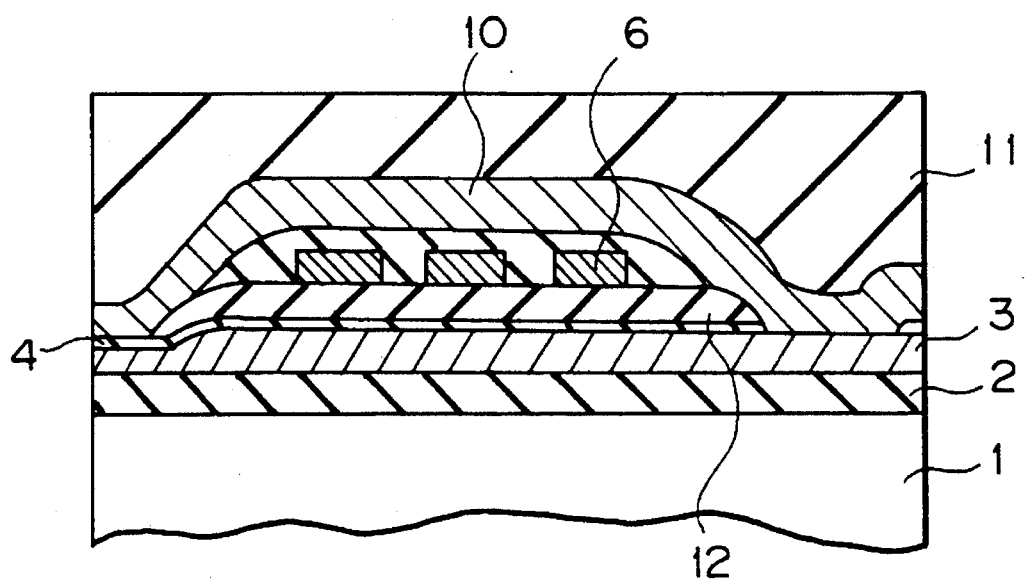

FIGS. 1a–1i are a set of sectional views showing the process for producing a thin-film magnetic head according to an embodiment of the first aspect of the present invention. Shown by 1–9 are the same components as those shown in FIG. 4A to describe the conventional process. Shown by 100 is a protective sacrificial layer; 100a is a film for enhancing adhesion to silicone; 111 is an insulating silicone film; 112 is a masking photoresist; 13 is a plasma of freon and oxygen; 14 is an oxygen plasma; 15 is an insulating silicone layer on the coil; and 16 is a plasma for etching the sacrificial layer.

Figure 1B:
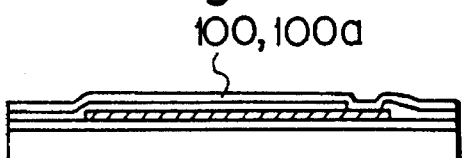

The process starts with forming a substrate protective film 2, a lower magnetic core 3 and a magnetic gap film 4 on the substrate 1 (FIG. 1a). The magnetic gap 4 may typically be formed of $Al_2O_3$. Then, a protective sacrificial layer 100 having different etching characteristics than the magnetic gap film 4 is formed by a suitable technique such as sputtering. The protective sacrificial layer 100 serves to protect the magnetic gap film during the etching of silicone and it is preferably made of a metal film that is hardly etchable with the plasma of freon and oxygen. If the protective sacrificial layer 100 is not removed before the formation of the upper magnetic core but is used as part of the gap film, a nonmagnetic metal film is used such as one made of Cu or Cr. If the protective sacrificial layer 100 is to be removed before the formation of the upper magnetic core, a magnetic film such as one made of permalloy may be used. Instead of forming the magnetic gap film of $Al_2O_3$, a nonmagnetic metal film may be directly formed of Cu or Cr on the lower magnetic core 3 so that it will serve both as a protective sacrificial layer as a magnetic gap film. The protective sacrificial layer 100 may be formed over the entire surface of the wafer; alternatively, only the portion that covers the magnetic gap may be left intact while the other portion of the protective layer is removed. The protective layer is then overlaid with a silicone adhesion enhancing film 100a, which may typically be formed by sputtering (FIG. 1b). The adhesion enhancing film 100a is preferably made of $SiO_2$ or $Si_3N_4$ which contains silicon element, or the principal component of the organic silicone resin. The thickness of the adhesion enhancing film 100a varies with the thickness of the lower magnetic core 3 and is typically in the range of from about 1 to 2 μm.

Figure 1C:
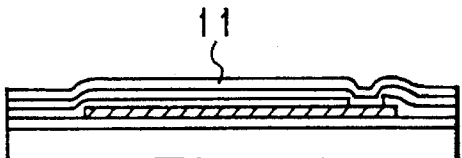
Figure 1D:
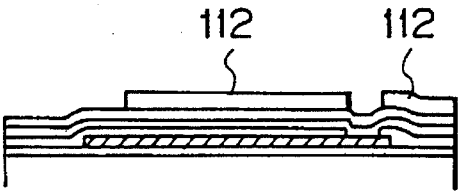
Figure 1E:
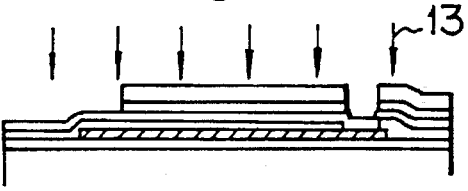

In the next step, the organic silicone resin 111 is whirl coated with a spinner and the applied coating is thermally cured by first heating it up to 350° C. in vacuum over 3 h and longer and then holding it at 350° C. for 1 h (see Fig. 1c). The photoresist 112 is then patterned in the form of the desired insulation layer by a photomechanical process (FIG. 1d). Subsequently, the assembly is exposed to the oxygen/freon plasma 13 so that the silicone resin is etched in the pattern of the first insulation layer (FIG. 1e). The plasma 13, if it consists of $CF_4$ and $O_2$ contains $O_2$ in an amount of 5–60 vol %.

Figure 1F:
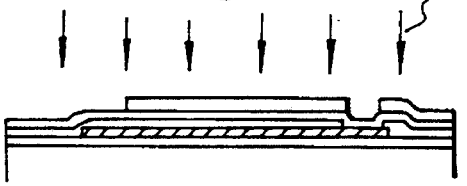
Figure 1G:
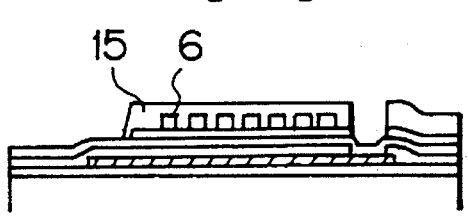

Then, the photoresist mask is subjected to ashing with the oxygen plasma 14 (FIG. 1f). Since the rate of etching the photoresist with oxygen is at least 10 times as fast as the etch rate of silicone, the silicone may be overetched without any problem after the end of ashing of the photoresist. Using a resist stripper such as acetone to strip the photoresist mask in place of performing ashing is unsuitable for patterning purposes since cracks will develop in the silicone resin.

Figure 1H:
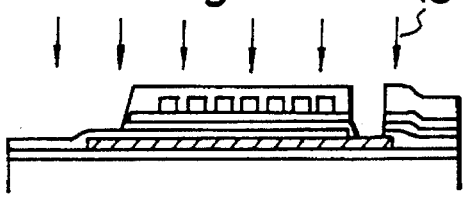

In the next step, the copper coil 6 is formed and the second insulation layer 15 is formed by the same procedure as used to form the silicone resin 111 in the pattern of the first insulation layer (see FIG. 1g), with the photoresist being left intact. The thickness of the photoresist to be left intact depends on the thickness of the adhesion enhancing film 100a and is typically a few microns. The exposed portion of the adhesion enhancing film 100a and the remainder of the photoresist mask are etched with the etching plasma 16 (FIG. 1h). The plasma 16, if it consists of $CF_4$ and $O_2$, contains oxygen in an amount of 5–60 vol %.

Figure 1I:
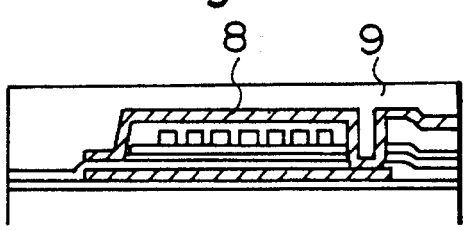

Subsequently, the protective sacrificial layer 100 is removed. If the protective sacrificial layer 100 present in the area corresponding to the magnetic gap is to be selectively removed, wet etching is adopted; on the other hand, if the protective sacrificial layer 100 present over the entire surface of the wafer is to be removed, an ion beam is used. Thereafter, the upper magnetic core 10 and the insulating protective film 9 are formed and polished (FIG. 1i). If necessary, the formation of the upper magnetic core may be accompanied by a heat treatment conducted to improve its magnetic characteristics.

The organic silicone resin has higher heat resistance than the heretofore used photoresist and, therefore, no cracks will develop in the insulation layer or the thin magnetic film formed as the upper magnetic core will not come off even in the presence of temperature elevation during the formation of said thin magnetic film or even if an optional heat treatment is thereafter conducted in order to improve the magnetic characteristics of that thin film. As a further advantage, the temperature range for the heat treatment of the thin magnetic film is expanded by a sufficient degree to improve its magnetic characteristics while expanding the range over which suitable film forming materials can be selected. In addition, the organic silicone resin has higher moisture resistance than the photoresist and, hence, higher reliability is insured for a prolonged period.

EXAMPLE 2

FIG. 2 is a set of sectional view showing the process for producing a thin-film magnetic head according to another embodiment of the first aspect of the present invention. Shown by 1–9, 111–112, and 13–16 are identical to those components which are described in Example 1. Shown by 100b is a film that serves both to protect the magnetic core and to enhance the adhesion to silicone. The head produced in Example 2 differs from what is produced in Example 1 in that the upper magnetic core 10 is not in contact with the organic silicone resin; therefore, if the magnetic film adheres poorly to the silicone or if it is unable to exhibit its inherent magnetic characteristics, the embodiment of Example 2 offers the advantage of improving not only the adhesion of the magnetic film to the silicone but also its magnetic characteristics.

The process starts with forming the substrate protective film 2 and the lower magnetic core 3 on the substrate 1. If necessary, the protective layer 100b for protecting the lower magnetic core 3 and providing enhanced adhesion to silicone may be formed (FIG. 2a). Then, the organic silicone resin 111 is whirl coated with a spinner (FIG. 2b) and the photoresist 112 is patterned in the form of the desired insulation layer by a photomechanical process (FIG. 2c).

Then, the assembly is exposed to the freon/oxygen plasma 13 so that the silicone resin is etched in a desired pattern (FIG. 2d). Subsequently, the resist mask is subjected to ashing with the oxygen plasma 14 (FIG. 2e). Then, the copper coil 6 is formed and the second insulation layer 15 is formed by the same procedure as used to form the silicone resin 11 in the pattern of the first insulation layer (see FIG. 2f). Thereafter, the film 100b which serves both to protect the magnetic core and to enhance the adhesion to silicone is etched with the plasma 16 (FIG. 2g). The compositions of the freon/oxygen plasmas 13 and 16 are the same as described in Example 1.

Subsequently, the gap film 4 is formed (FIG. 2h) and, thereafter, the upper magnetic core 10 and the insulating protective film 9 are formed and polished (FIG. 2i). If necessary, the formation of the upper magnetic core may be accompanied by a heat treatment conducted to improve its magnetic characteristics.

EXAMPLE 3

FIG. 3 is a set of sectional views showing the process for producing a thin-film magnetic head according to yet another embodiment of the first aspect of the present invention. Shown by 1–9, 111–112, and 13–16 are identical to those components which are described in Example 1. Shown by 17 is an ion beam. In Example 3, the photoresist mask is not only subjected to ashing with an oxygen plasma but it is also treated by subsequent ashing with an ion beam; as a result, the profile of the patterned surface of the resist will be transferred faithfully to the silicone surface, thereby producing a smooth patterned silicone surface that is free from the effect of undulations in the profile of the underlying layer.

Figure 3A:
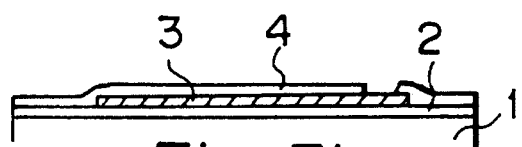
FIGS. 3a–3j are is a set of sectional views showing the process for producing a thin-film magnetic head according to yet another embodiment of the first aspect of the present invention.
Figure 3B:
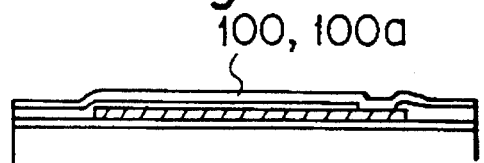
Figure 3C:
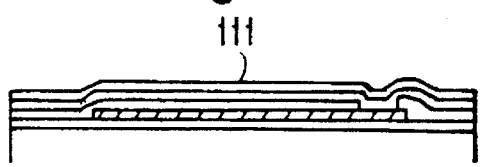

The process starts with forming the substrate protective film 2, the lower magnetic core 3 and the thin-film gap 4 (FIG. 3a). Then, the protective sacrificial film 100 and the adhesion enhancing film 100a are formed by the same method as used in Example 1 (FIG. 3b).

Figure 3D:
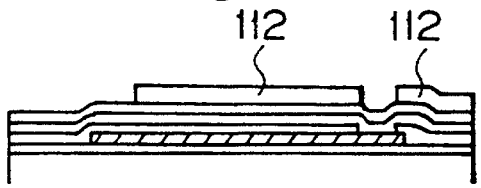

Subsequently, the organic silicone 111 is spin coated (FIG. 3c) and the photoresist 112 is formed in the pattern of the desired insulation layer by a photomechanical process (FIG. 3d). The applied photoresist is thicker than in the case of Example 1.

Figure 3E:
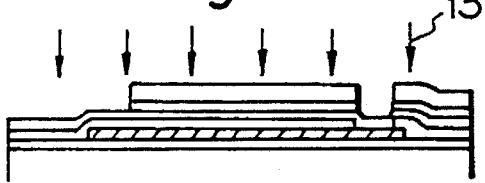
Figure 3F:
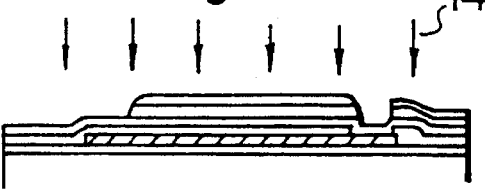
Figure 3G:
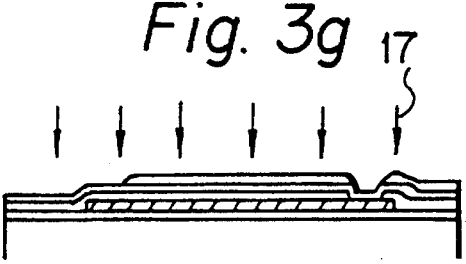
Figure 3H:
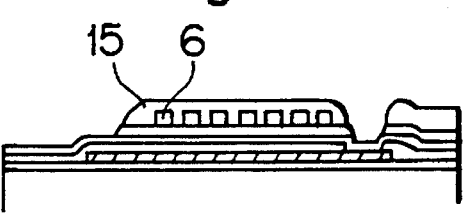
Figure 3I:
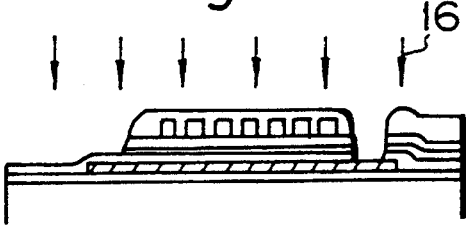
Figure 3J:
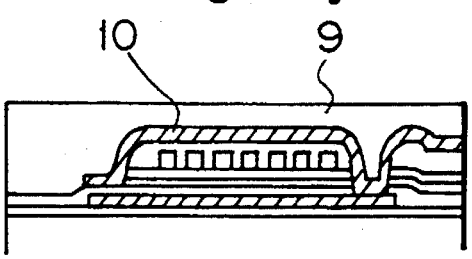

Then, the assembly is exposed to the oxygen/freon plasma 13 so that the silicone resin is etched in a desired pattern (FIG. 3e). Subsequently, the resist mask 112 is subjected to ashing with the oxygen plasma 14 (FIG. 3f). Since the photoresist 112 is thicker than in the case of Example 1, a small portion of the resist will remain on the silicone pattern and is subsequently removed with the ion beam 17 (FIG. 3g). The copper coil 6 is formed and the upper insulation layer 15 is formed by the same procedure as used to form the silicone resin 111 in the pattern of the first insulation layer (see FIG. 3h). Compared to ashing the entire portion of the resist with the oxygen plasma 14, the use of the ion beam 17 offers the advantage that the profile of the patterned surface of the resist is transferred faithfully to the silicone surface, thereby providing a smooth patterned silicone surface that is free from the effect of undulations in the profile of the underlying layer. This is particularly effective in improving the magnetic characteristics of the magnetic film when it is to be overlaid with the upper insulation layer 15. The protective sacrificial layer 100 and the adhesion enhancing layer 100a may be removed by the same method as used in Example 1 (FIG. 3i). The upper magnetic core 10 and the insulating protective film 9 are formed and polished (FIG. 3j). If necessary, the formation of the upper magnetic core may be accompanied by a heat treatment conducted to improve its magnetic characteristics.

When forming the adhesion enhancing film in Examples 1–3, the first silicone insulation layer may be omitted and the conductor coil may be formed just above said adhesion enhancing film if said film is thick enough to insure electrical insulation between the lower magnetic core and the conductor coil. The conductor coil need not be single-layered and it may consist of two or more layers.

As is clear from the foregoing description, the process of the first aspect of the present invention is capable of easily forming an interlevel insulation layer between the magnetic core and the coil and, furthermore, adopting the dry film deposition method, the process is capable of producing a thin-film magnetic head having improved magnetic recording characteristics and reproduction efficiency. Hence, the present invention will offer great benefits in commercial applications.

EXAMPLE 4

Figure 5:
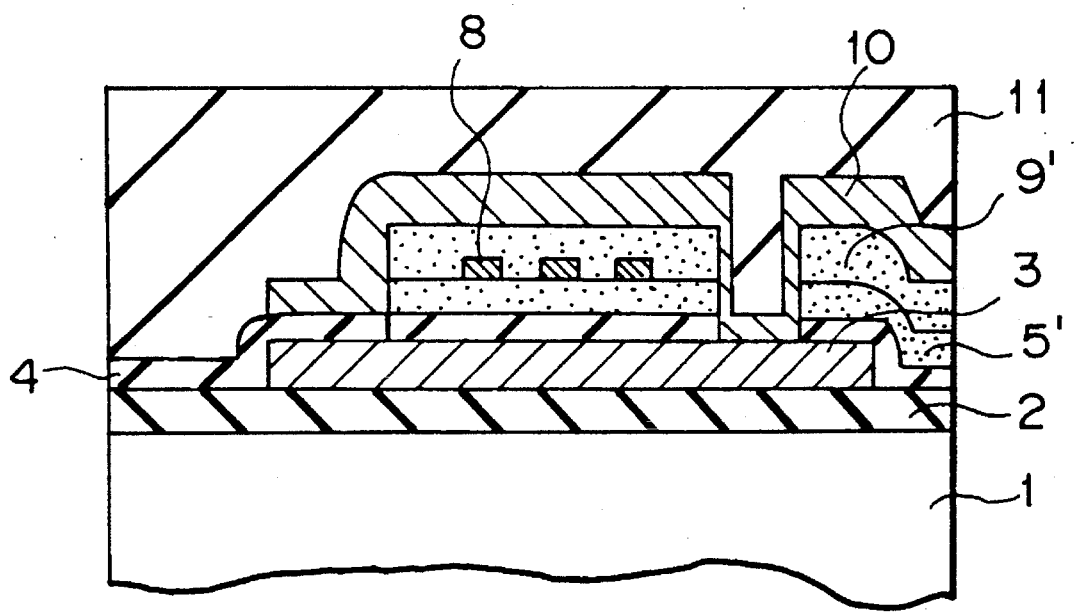
FIG. 5 is a sectional view showing the thin-film magnetic head of the second aspect of the present invention.

FIG. 5 is a set of sectional views showing the process for producing a thin-film magnetic head according to an embodiment of the second aspect of the present invention. Shown by 1–4, 6 and 10–11 are the same components as those shown in FIGS. 4a–4f to describe the conventional head structure. Shown by 5' and 9' are the first and second insulation layers, respectively, that are both made of a ladder-type silicone resin.

The thin-film magnetic head of Example 4 differs from the prior art version which uses a photoresist as an insulation layer and a permalloy plate as a magnetic core, except that the coil insulating layer is made of two layers of ladder-type silicone resin 5' and 9'. The upper limit of the process temperature is the one at which the silicone resin of a ladder type is heat treated for curing. In Example 4, heat treatment following the formation of the protective $Al_2O_3$ layer is performed at 230° C. in order to provide improved magnetic characteristics; since the laddertype silicone resin resists heating at that temperature, it will not come off unlike the resist and this contributes to the production of a thin-film magnetic head capable of stable operation.

Figure 6A:
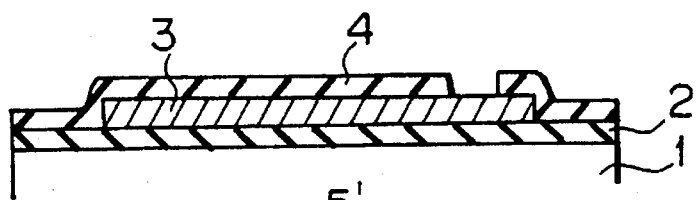
FIGS. 6a–6g are a set of sectional views showing the process for producing a thin-film magnetic head according to an embodiment of the second aspect of the present invention.
Figure 6B:
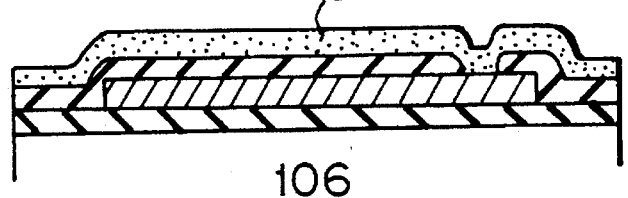
Figure 6C:
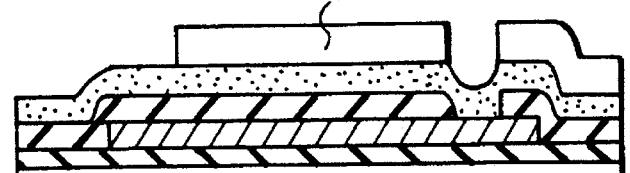

The process of producing the thin-film magnetic head shown in FIG. 5 is described below with reference to FIGS. 6a–6g The process starts with forming, successively, the substrate protective film 2, the lower magnetic core 3 and the magnetic gap film 4 on the substrate 1 (FIG. 6a). Subsequently, varnish that has a ladder-type silicone resin dissolved in anisole to give a resin concentration of ca. 20 wt% is applied with a spinner onto the undercoated substrate and dried at 150° C. for 30 min (FIG. 6b). The ladder-type silicone resin has terminal silanol groups, a molecular weight of ca. $1.2 \times 10^5$, contains a phenyl group in side chains and is represented by the chemical formula (3) set forth below. The resulting insulating resin layer 5' is overlaid with a photoresist 106 which is formed by a photomechanical process (FIG. 6c).

Figure 6D:
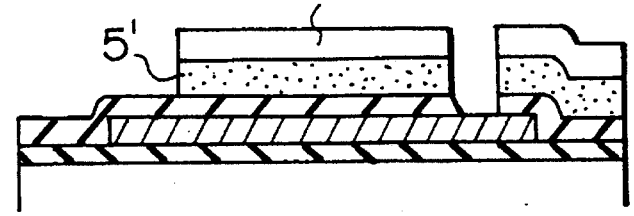
Figure 6E:
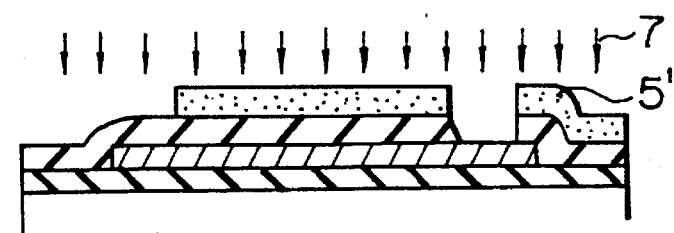
Figure 6F:
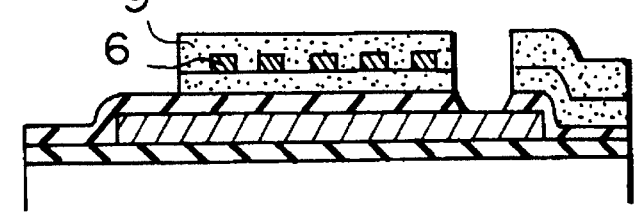
Figure 6G:
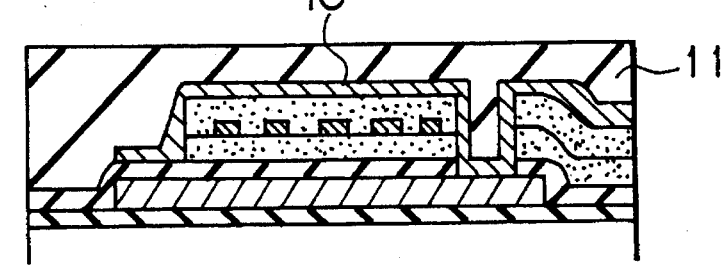

Then, using a solvent system composed of anisole and xylene, a predetermined pattern is formed on the ladder-type silicone resin film 5' (FIG. 6d). Subsequently, the resist mask 106 is subjected to ashing with oxygen plasma 107 and heat treated at 350° C. for 30 min (FIG. 6e). Then, the copper coil 8 is formed and the second insulation layer 9' is also formed by the same procedure as used to form the ladder-type silicone resin layer 5' in the pattern of the intended insulation layer (FIG. 6f). Further, the upper magnetic core 10 and the insulating protective film 11 are formed and polished (FIG. 6g). If necessary, the formation of the upper magnetic core may be accompanied by a heat treatment conducted to improve its magnetic characteristics.

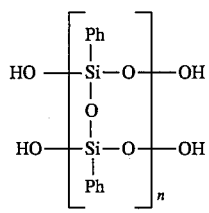

(3)

(where Ph is a phenyl group; and n is an integer providing a weight average molecular weight of ca. $10^5$).

The ladder-type silicone resin used in the coil insulating layer has higher heat resistance than the heretofore used photoresist and, therefore, no cracks will develop in the insulation layer or the thin magnetic film formed as the upper magnetic core will not come off even in the presence of temperature elevation during the formation of said thin magnetic film or even if an optional heat treatment is conducted in order to improve the magnetic characteristics of that thin film. As a further advantage, the temperature range for the heat treatment of the thin magnetic film is expanded by a sufficient degree to improve its magnetic characteristics while expanding the range over which suitable film forming materials can be selected. In addition, the silicone resin of ladder type has higher moisture resistance than the photoresist and hence, higher reliability is insured for a prolonged period.

EXAMPLE 5

FIG. 7 is a set of sectional views showing the process for producing a thin-film magnetic head according to another embodiment of the second aspect of the present invention, in which a photosensitive resin represented by the chemical formula (4) set forth below is used as a silicone resin of a ladder type.

Figure 7A:
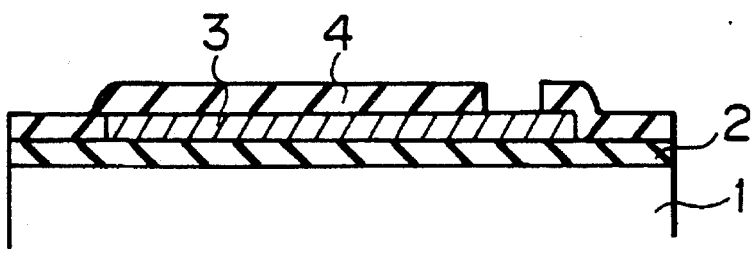
FIGS. 7a–7e a set of sectional views showing the process for producing a thin-film magnetic head according to another embodiment of the second aspect of the present invention.
Figure 7B:
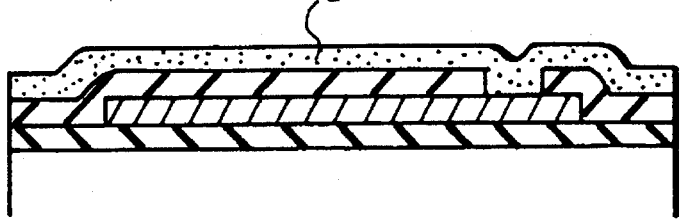

As in Example 4, the substrate protective film 2, the lower magnetic core 3 and the magnetic gap 4 are successively formed on the substrate 1 (FIG. 7a). The assembly is then spin coated with a varnish having the photosensitive silicone resin of ladder type dissolved in an organic solvent and the applied coating is dried at 80° C. for 30 min to form the first insulation layer 5 (FIG. 7b).

Figure 7C:
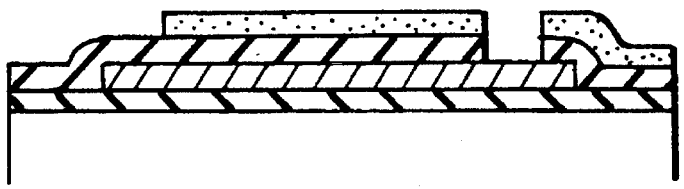
Figure 7D:
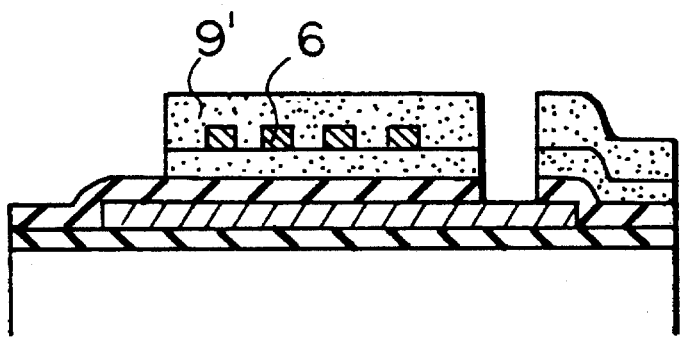
Figure 7E:
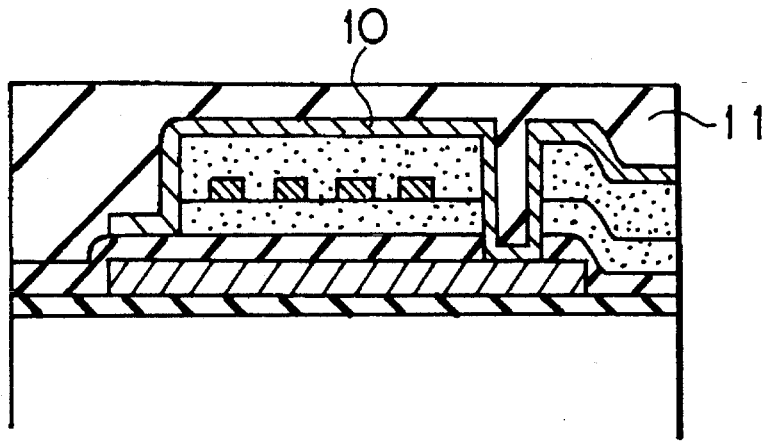

Subsequently, the assembly is exposed to light through a mask having a predetermined pattern. Then, the unexposed area is dissolved away with a solvent system composed of anisole and xylene; thereafter, the assembly is dried at 80° C. for 30 min and heat treated at 240° C. for 60 min to form a satisfactory film (FIG. 7c). The coil 6 is then formed as in Example 4 and a photosensitive silicone resin of ladder type that is represented by the chemical formula (4) set forth below is applied to form the second insulation layer 9' which flattens out the undulations in the coil layer (FIG. 7d). Subsequently, the upper magnetic core 10 and the protective insulation layer 11 are formed in that order. If necessary, an optical heat treatment is conducted to provide improved magnetic characteristics, thereby producing a thin-film magnetic head as shown in FIG. 7e.

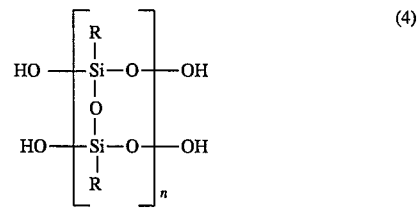

(4)

(where R is a phenyl or a vinyl group, with the vinyl group being present in an amount of 25 mol %; and n is an integer providing a weight average molecular weight of ca. $10^5$).

Comparative Example 1

A thin-film magnetic head was produced as in Example 4 except that the silicone resin of a ladder type was replaced by a resist. When a heat treatment was conducted at 230° C. after the formation of the insulating protective film, the resist was decomposed thermally and separation occurred between the protective film and the resist.

Comparative Example 2

A thin-film magnetic head was produced as in Example 4 except that the silicone resin of a ladder type was replaced by polyimide. To heat cure the polyimide film, a heat treatment was conducted at 350° C. for 60 min. As a result, the weight of the polyimide film dropped by ca. 30% and the flatness of the coil layer deteriorated. Furthermore, a large amount of gas was evolved, which not only fouled the back side of the substrate but also reacted with the coil; consequently, the magnetic characteristics of the magnetic head deteriorated considerably.

As described on the foregoing pages, according to the second aspect of the present invention, a silicone resin of ladder type that has high heat resistance and strong adhesion is used in forming an insulation layer that establishes electrical insulation between the thin-film magnetic core and the thin-film conductor coil on the substrate and which also flattens out the undulations in the undercoat. Hence, there is provided a thin-film magnetic head that has a high-density coil wound around a magnetic core that is made of a high flux magnetic material adapted for high-density recording and which can be manufactured at low cost while insuring high operational reliability.

What is claimed is:

1. A process for producing a thin-film magnetic head, said head comprising a substrate, a lower thin-film magnetic core formed on said substrate, a thin-film gap formed on said lower magnetic core, an insulation layer formed on said gap that electrically insulates said coil and said magnetic cores, said insulation layer being formed of an organic silicon resin with a ladder structure that is chiefly composed of silicon, oxygen and carbon, a thin-film conductor coil formed on said insulation layer, and an upper thin-film magnetic core formed on said coil, said process comprising the step of forming on said thin-film gap a protective sacrificial layer having a different etching property than said thin-film gap, thereby preventing the etching of said thin-film gap so as to facilitate the control of its thickness.

2. A process for producing a thin-film magnetic head, said thin-film magnetic head comprising a substrate, a lower thin-film magnetic core formed on said substrate, a thin-film gap formed on said lower magnetic core, an insulation layer formed on said gap that electrically insulates said coil and said magnetic cores, said insulation layer being formed of an organic silicon resin with a ladder structure that is chiefly composed of silicon, oxygen and carbon, a photoresist being used as an etching mask, the pattern of the insulation layer being formed by etching with a plasma of oxygen and a freon containing at least one member selected from among $CF_4$, $SF_6$ and $CHF_3$, and the photoresist mask being subsequently removed by ashing, a thin-film conductor coil formed on said insulation layer, and an upper thin-film magnetic core formed on said coil, said process comprising the steps of forming a thin inorganic film containing a silicon element for providing enhanced adhesion before the organic silicone resin is patterned to form the insulation layer, and removing said adhesion-enhancing thin film before formation of said magnetic cores.

3. A process for producing a thin-film magnetic head, said thin-film magnetic head comprising, a substrate, a lower thin-film magnetic core formed on said substrate, a thin-film gap formed on said lower magnetic core, an insulation layer formed on said gap that electrically insulates said coil and said magnetic cores, said insulation layer being formed of an organic silicon resin with a ladder structure that is chiefly composed of silicon, oxygen and carbon, a photoresist being used as an etching mask, the pattern of the insulation layer being formed by etching with a plasma of oxygen and a freon containing at least one member selected from among $CF_4$, $SF_6$ and $CHF_3$, and the photoresist mask being subsequently removed by ashing, a thin-film conductor coil formed on said insulation layer, and an upper thin-film magnetic core formed on said coil, said process comprising the steps of forming the lower thin-film magnetic core, the thin-film conductor coil and the insulation layer that electrically insulates said lower magnetic core from said coil, subsequently forming the thin-film gap and then forming the upper magnetic core.

4. A process for producing a thin-film magnetic head, said thin-film magnetic head comprising, a substrate, a lower thin-film magnetic core formed on said substrate, a thin-film gap formed on said lower magnetic core, an insulation layer formed on said gap that electrically insulates said coil and said magnetic cores, said insulation layer being formed of an organic silicon resin with a ladder structure that is chiefly composed of silicon, oxygen and carbon, a photoresist being used as an etching mask, the pattern of the insulation layer being formed by etching with a plasma of oxygen and a freon containing at least one member selected from among $CF_4$, $SF_6$ and $CHF_3$, and the photoresist mask being subsequently removed by ashing, a thin-film conductor coil formed on said insulation layer, and an upper thin-film magnetic core formed on said coil, said process comprising the steps of ashing the resist mask with an oxygen plasma and subsequently performing ashing with an ion beam.

5. A process for producing a thin-film magnetic head, said head comprising a substrate having formed thereon a thin-film magnetic core formed over said substrate, a thin-film gap formed on said magnetic core, an insulation layer formed on said gap that electrically insulates said coil from said magnetic core, said insulation layer being formed of a silicone resin of a ladder type, and a thin-film conductor coil formed on said insulation layer, said process comprising the steps of forming said insulation layer of a thermosetting silicone resin of a ladder type by first whirl coating a solution of said silicone resin on the substrate, then drying the coat, subsequently forming a predetermined pattern using an organic solvent with a resist mask, and finally heat treating the resulting layer.

6. A process for producing a thin-film magnetic head, said head comprising a substrate having formed thereon a thin-film magnetic core formed over said substrate, a thin-film gap formed on said magnetic core, an insulation layer formed on said gap that electrically insulates said coil from said magnetic core, said insulation layer being formed of a silicone resin of a ladder type, and a thin-film conductor coil formed on said insulation layer, said process comprising the steps of forming said insulation layer of a photosensitive silicone resin of a ladder type by first whirl coating a solution of said silicone resin on the substrate, then drying the coat, exposing dried silicone resin film to uv radiation through a predetermined mask pattern, then dissolving the unexposed area with an organic solvent to form a predetermined pattern, and finally heat treating the resulting layer.

7. A process for producing a thin-film magnetic head comprising the steps of:

forming a first thin-film magnetic core on a substrate;

forming a thin-film gap on said lower magnetic core;

forming an insulation layer on said gap that electrically insulates said coil and said magnetic cores, said insulation layer being formed of an organic silicon resin with a ladder structure that is chiefly composed of silicon, oxygen and carbon;

using a photoresist as an etching mask, the pattern of the insulation layer being formed by etching with a plasma of oxygen and a freon containing at least one member selected from among $CF_4$, $SF_6$ and $CHF_3$;

subsequently removing the photoresist mask by ashing;

forming a thin-film conductor coil on said insulation layer;

forming a second thin-film magnetic core on said coil; and forming a protective sacrificial layer on said thin-film gap, said protective sacrificial layer having a different etching property than said thin-film gap, thereby preventing the etching of said thin-film gap so as to facilitate the control of the thickness of said thin-film gap.

8. The process according to claim 7, further comprising the steps of:

forming a thin inorganic film containing a silicon element for providing enhanced adhesion before the organic silicone resin is patterned to form the insulation layer; and removing said adhesion-enhancing thin film before formation of said magnetic cores.

9. The process according to claim 7, wherein:

the first thin-film magnetic core, the thin-film conductor coil and the insulation layer that electrically insulates said first magnetic core from said coil are formed;

subsequently the thin-film gap is formed; and then the second magnetic core is formed.

10. The process according to claim 7, further comprising the steps of:

ashing the resist mask with an oxygen plasma; and subsequently performing ashing with an ion beam.

11. A process for producing a thin-film magnetic head comprising the steps of:

forming a thin-film magnetic core over a substrate;

forming a thin-film gap on said magnetic core;

forming an insulation layer on said gap that electrically insulates said coil from said magnetic core, said insulation layer being formed of a silicone resin of a ladder type;

forming a thin-film conductor coil on said insulation layer;

wherein said step of forming said insulation layer of a thermosetting silicone resin of a ladder type comprises the steps of:

whirl coating a solution of said silicone resin on the substrate;

drying the coat;

subsequently forming a predetermined pattern using an organic solvent with a resist mask; and heat treating the resulting layer.

12. A process for producing the thin-film magnetic head comprising the steps of:

forming a thin-film magnetic core over a substrate; forming a thin-film gap on said magnetic core;

forming an insulation layer on said gap that electrically insulates said coil from said magnetic core, said insulation layer being formed of a silicone resin of a ladder type;

forming a thin-film conductor coil on said insulation layer;

wherein said step of forming said insulation layer of a thermosetting silicone resin of a ladder type comprises the steps of:

whirl coating a solution of said silicone resin on the substrate;

drying the coat;

exposing dried silicone resin film to uv radiation through a predetermined mask pattern;

dissolving the unexposed area with an organic solvent to form a predetermined pattern; and heat treating the resulting layer.

* * * * *